United States Patent [19]

Packard et al.

[11] Patent Number: 4,642,785
[45] Date of Patent: Feb. 10, 1987

[54] CORDLESS ELECTRONIC THERMOMETER

[75] Inventors: Roger E. Packard, Huntington Beach, Calif.; Jacob E. Thomas, Ithaca, N.Y.

[73] Assignee: NCR Corporation, Dayton, Ohio

[21] Appl. No.: 721,724

[22] Filed: Apr. 10, 1985

[51] Int. Cl.⁴ .......................... G01K 7/24; G01K 7/10
[52] U.S. Cl. .................................... 364/557; 374/102; 374/169; 377/25
[58] Field of Search ............... 374/102, 163, 158, 169, 374/170, 179, 183, 189, 208, 209, 210; 320/37; 364/557

[56] References Cited

U.S. PATENT DOCUMENTS

| | | | |
|---|---|---|---|
| 3,822,598 | 7/1974 | Brothers et al. | 374/158 |
| 3,872,727 | 3/1975 | Johnson | 374/158 |
| 3,978,325 | 8/1976 | Goldstein | 374/170 X |
| 4,068,526 | 1/1978 | Goldstein | 374/170 X |
| 4,092,863 | 6/1978 | Turner | 374/170 |
| 4,176,556 | 12/1979 | Takenaka | 374/170 |
| 4,199,986 | 4/1980 | Ganslmeier et al. | 374/183 |
| 4,447,884 | 5/1984 | Wada | 374/102 |
| 4,457,633 | 7/1984 | Andrews | 374/183 |
| 4,536,851 | 8/1985 | Germanton et al. | 374/102 |

OTHER PUBLICATIONS

"A New Quick and Easy Way to Measure Temperature" by Craftemp-Sweden-(3-1980).

Primary Examiner—Daniel M. Yasich
Attorney, Agent, or Firm—Wilbert Hawk, Jr.; Edward Dugas; Floyd A. Gonzalez

[57] ABSTRACT

An electronic thermometer having a temperature sensing element for sensing a temperature and providing, over time, a series of temperature related electric parameters, and a data storing circuit connected to the temperature sensing element for storing the series of temperature related electric parameters. A data transmitting device is included which has an output and which is connected to the data storing circuit for transmitting the mentioned series of temperature related electric parameters upon command. A connector connected to the output of the data transmitting device has a command input which, when connected to a power source, receives an electrical command for commanding the data transmitting device to transmit data, and further has a data output device for providing thereon the data transmitted from the data transmitting device. An electrical energy storage device is electrically connected to the connector, and, when the connector is connected to the power source, receives and stores electrical energy. When the connector is not connected to the power source, the electrical energy storage device supplies the stored electrical energy to the temperature sensing element and the data storing circuit.

7 Claims, 5 Drawing Figures

CORDLESS ELECTRONIC THERMOMETER

BACKGROUND OF THE INVENTION

The present invention is related to temperature measuring devices for taking the temperature of medical patients, and is more particularly related to cordless electronic thermometers.

Electronic thermometers have recently been developed to take the place of mercury thermometers for taking the temperature of medical patients. In many of these devices, the temperature sensing probe which is placed in contact with the patient, such as under the patient's tongue, must be continuously connected to a source of power and other electronic circuitry for converting an electrical parameter of the probe to a temperature reading. This is normally done by a long cord which is attached at one end to the temperature sensing probe, and at the other end to appropriate electronics.

U.S. Pat. No. 4,176,556 issued Dec. 4, 1979 to Takenaka for "Electronic Thermometer", discloses an electronic thermometer which utilizes a microprocessor, a bridge circuit containing a temperature responsive transducer, a charge and discharge circuit, and an interrupt signal generating circuit. A counted value corresponding to a reference temperature is added to a counted value corresponding to the time it takes a capacitor connected to the bridge circuit to discharge, and the result is converted to a temperature degree and displayed by the microprocessor.

Other patents of interest are: U.S. Pat. Nos. 3,348,415 issued Oct. 24, 1967 for "Temperature Measuring Device"; 3,851,528 issued Dec. 3, 1974 for "Electronic Thermometer"; 3,978,325 issued Aug. 31, 1976 for "Electronic Thermometer"; 4,008,617 issued Feb. 22, 1977 for "Electronic Thermometer and Method"; 4,022,063 issued May 10, 1977 for "Electromechanical Digital Thermometer"; and 4,371,271 issued Feb. 1, 1983 for "Electronic Thermometer".

SUMMARY OF THE INVENTION

In a preferred embodiment, the invention includes a temperature sensing element for sensing a temperature and providing, over time, a series of temperature related electric parameters, and a data storing circuit connected to the temperature sensing element for storing the series of temperature related electric parameters. A data transmitting device is included which has an output and which is connected to the data storing circuit for transmitting the mentioned series of temperature related electric parameters upon command. A connector connected to the output of the data transmitting device has a command input which, when connected to a power source, receives an electrical command for commanding the data transmitting device to transmit data, and further has a data output for providing thereon the data transmitted from the data transmitting device. An electrical energy storage device is electrically connected to the connector, and, when the connector is connected to the power source, receives and stores therein electrical energy. When the connector is not connected to the power source, the electrical energy storage device supplies the stored electrical energy to the temperature sensing element and the data storing circuit.

It is a primary object of the present invention to provide an electronic thermometer which is self contained and does not need an electrical connection to the master unit to take a reading.

It is a further object of the present invention to provide an electronic thermometer which stores a plurality of readings over a period of time, which readings may be subsequently transmitted to a master unit.

It is a further object of the present invention to provide an electronic thermometer which has a data collecting cycle wherein temperature readings are taken from a patient, and a data transmission cycle wherein the temperature readings are transmitted from the thermometer to a master unit for permanent storage.

It is a further object of the present invention to provide an electronic thermometer whose power source for the data collection cycle is a capacitor.

It is a further object of the present invention to provide an electronic thermometer which includes a plurality of capacitors for storing temperature related readings collected by the thermometer during its data collection cycle.

These and other objects of the present invention will become apparent from the preferred embodiments and drawings disclosed herein.

DESCRIPTION OF THE PREFERRED EMBODIMENTS

Figure 1:
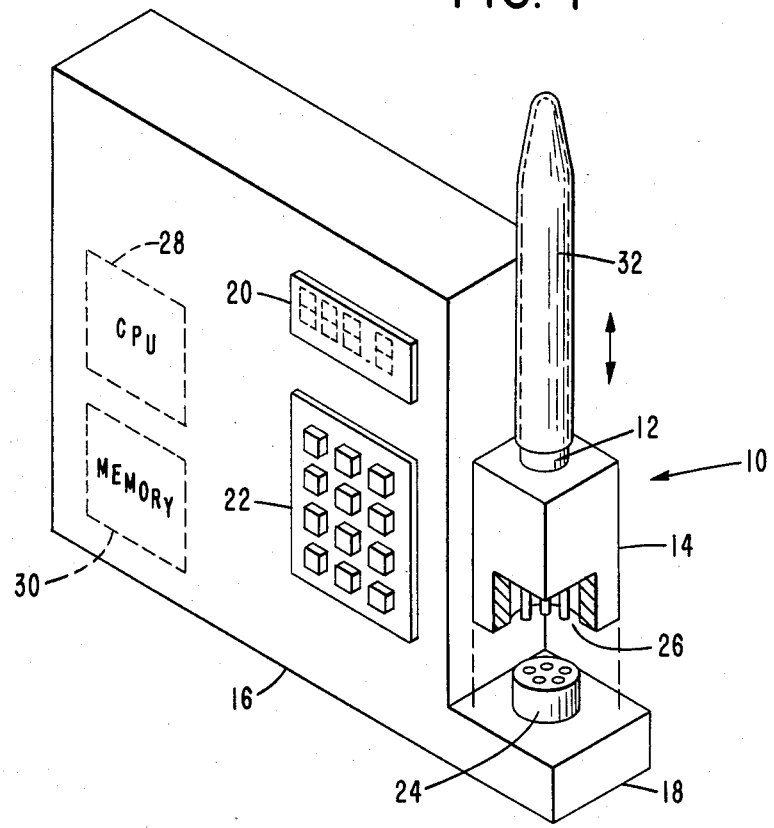
FIG. 1 is a diagramatic illustration of a cordless electronic thermometer and its master unit which includes the present invention.

FIG. 1 is a diagrammatic illustration of a cordless electronic thermometer and its master unit which includes the present invention. The thermometer unit 10 includes a thermometer probe 12 and a housing portion 14 for housing the electronics of the thermometer unit. The master unit 16 includes a thermometer receiving portion 18, a temperature readout display 20 and a data entry key pad 22. The thermometer receiving portion 18 of the master unit 16 includes a connector portion 24 which mates with a corresponding connector portion 26 in the housing 14 of the electronic thermometer unit 10. The master unit 16 further includes a central processing unit 28 and a memory 30.

Prior to use, a nurse places the thermometer unit 10 in the thermometer receiving portion 18 of the master unit 16 and mates the connector unit portions 24 and 26 together to make an electrical connection. As will be discussed, the electronics in the housing portion 14 are then prepared by a charging cycle to receive temperature data from a patient. When the charging cycle of the preparation of the electronics is completed, the thermometer unit 10 is removed from the master unit 16 and the temperature probe 12 is covered with a throw away protective sheath 32 and placed under the tongue of a patient, the protective sheath 32 having been previously sterilized.

The nurse is now free to leave the patient to perform other duties while the patient's temperature is being measured by the thermometer unit 10.

After an appropriate length of time, the nurse removes the thermometer unit 10 from the mouth of the patient and plugs it into the thermometer receiving portion 18 of the master unit 16, once again mating the connector portions 24 and 26. The nurse may make appropriate entries in the data entry key pad 22, such as the patients number, time-of-day, nurse identification, or other information needed for the proper recording of the patients temperature. Then, under the control of the CPU 28, the readings taken by the thermometer unit 10, as will be discussed, are used to calculate the patient's temperature. The calculated temperature may be displayed on the temperature display 20, and stored in the memory 30 along with the previously entered data for later readout and permanent storage.

The master unit 16 may either be a central unit located at a nurses station, or it may be a nurses portable unit which is carried by the nurse.

Figure 2:
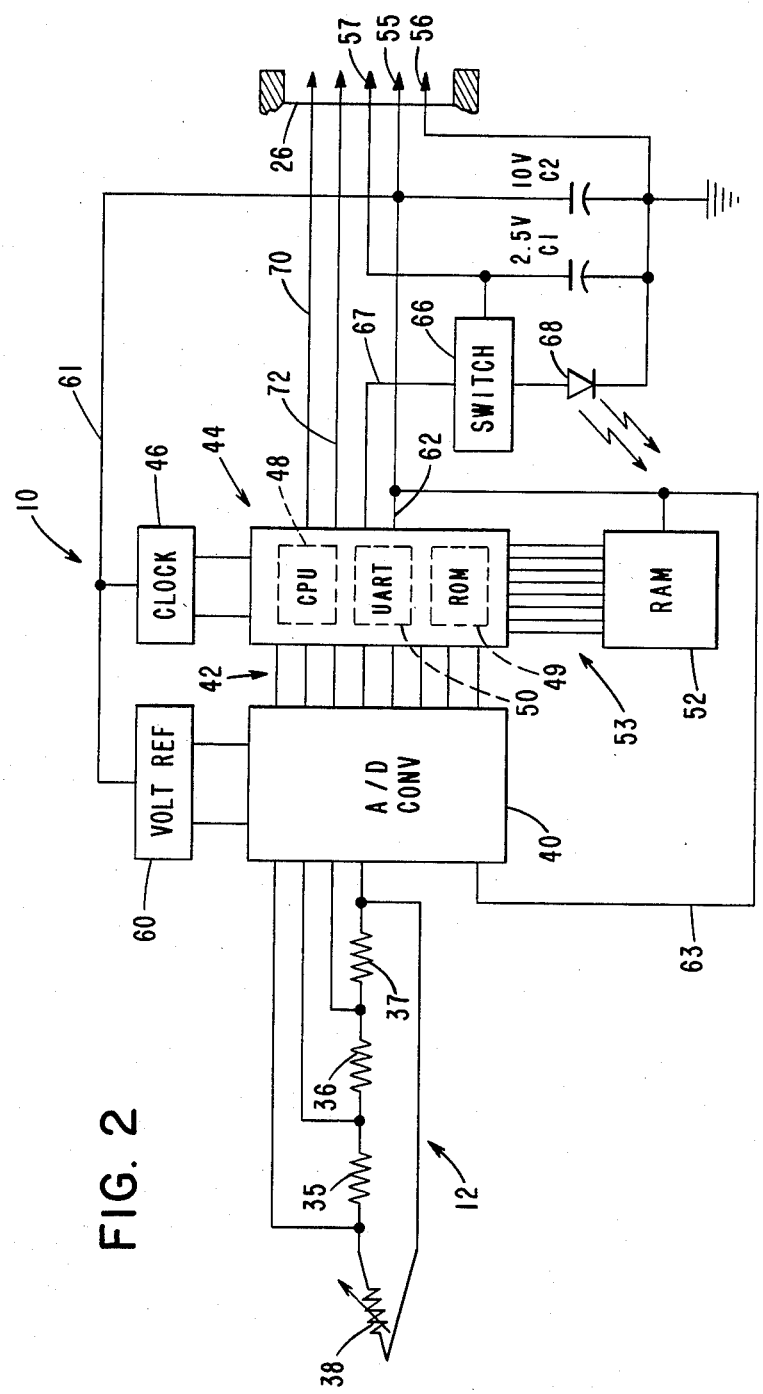
FIG. 2 is a schematic diagram of one embodiment of the electronic thermometer of FIG. 1.

FIG. 2 presents a schematic diagram of one embodiment of the electronic thermometer unit 10 of FIG. 1. The thermometer probe 12 (also shown in FIG. 1) includes a bridge circuit made up of resistors 35, 36 and 37, and a thermistor 38. It will be understood that with power applied across the bridge circuit of thermometer probe 12 and the thermometer probe 12 placed under the tongue of a patient, the voltage reading across the bridge circuit will change as the resistance of the thermistor 38 changes in response to the heat of the patient.

It will further be understood that with the sheath 32 over the thermometer probe 12 (see FIG. 1), the sheath 32 will act as an insulator thereby delaying the transfer of heat from the patient to the thermistor 38. Algorithms are known in which a plurality of temperature related measurements may be made over a period of time, and the measurements compared to a temperature-versus-time curve to predict, very accurately, what the final temperature will be. Thus, it is unnecessary to wait until the temperature of the probe 12 reaches its final value as long as sufficient temperature related readings are made over a period of time. In this case, the temperature related readings are the various voltage drops across the bridge circuit.

The electronic thermometer unit 10 also includes an analog-to-digital converter 40 for converting the voltage readings across the bridge circuit of probe 12 to digital information. This digital information is transmitted from the analog-to-digital converter circuit 40 over a bus 42 to a data control circuit 44.

The data control circuit 44 is driven by a clock 46 which times the various functions of the circuit 44. The data control circuit 44 also includes a central processing unit 48, a read only memory (ROM) 49, and a universal asynchronous receiver transmitter (UART) 50. The CPU 48 controls the various data transfer functions, to be described, as programmed by a set of instructions stored in the ROM 49.

In the data collecting mode, the CPU 48 controls the analog-to-digital converter 40 to transfer data over bus 42 and data bus 53, to be stored in a random access memory (RAM) 52.

The electronic thermometer unit 10 also includes a 1000 microfarad, 10 volt capacitor C2 for supplying power to the various electronic components of the unit, and a 100 microfarad, 2.5 volt capacitor C1 which provides power to a switch 66 and a light emitting diode (LED) 68 to be discussed. When the electronic thermometer unit 10 is connected, via connector portions 24 and 26, to the master unit 16, as discussed in connection with FIG. 1, a first voltage source (not shown) is connected at a connector pin 55, and a connector pin 56 is grounded to charge the capacitor C2. A second voltage source (not shown) is also connected at a pin 57 to charge the capacitor C1.

The electronic thermometer unit 10 is then removed from the master unit 16 and placed under the tongue of a patient to take the patients temperature. The now disconnected capacitor C2 supplies power to the clock 46 and a voltage reference circuit 60 over conductor 61. Capacitor C2 also provides power to the data control circuit 44, the RAM 52, and the analog-to-digital converter 40 over conductors 62 and 63 respectively.

The electronic thermometer unit 10 is now in the data collecting mode wherein voltage readings across the bridge circuit of the probe 12 are converted to digital readings by the analog to digital converter 40. The CPU 48 then transfers the digital readings over buses 42 and 53 for storage in the RAM 52. After sufficient readings have been stored, the CPU sends a signal over conductor 67 to instruct the switch 66 to close, thereby energizing the LED 68. It will be noted, that the LED 68 is powered by the capacitor C1 so as to not place an additional burden on the capacitor C2 supplying power for the other electronics. The lighting of the LED 68 indicates that the thermometer unit 10 is finished taking temperature readings and that it may be returned to the master unit 16.

When the electronic thermometer unit 10 has been returned to the master unit 16 and the connector portions 24 and 26 have been mated, the master unit 16 issues a command over a conductor 70 to the CPU 48 of the data control circuit 44. Upon receiving the command from conductor 70, the CPU 48 reads the stored digital readings from the RAM 52 and instructs the UART 50 to transmit the digital readings over a data line 72 to the master unit 16 for processing. As is known, the UART 50 performs the parallel-to-series conversions necessary to transmit the data from the RAM 52 over line 72 in a serial fashion to the master unit 16.

As previously discussed in connection with FIG. 1, the CPU 28 of the master unit 16 may analyze the periodic digital readings from the electronic thermometer unit 10 to calculate and display a temperature reading on temperature display 20 and store the calculated reading in memory 30 for entry into the patient's permanent records.

Figure 3:
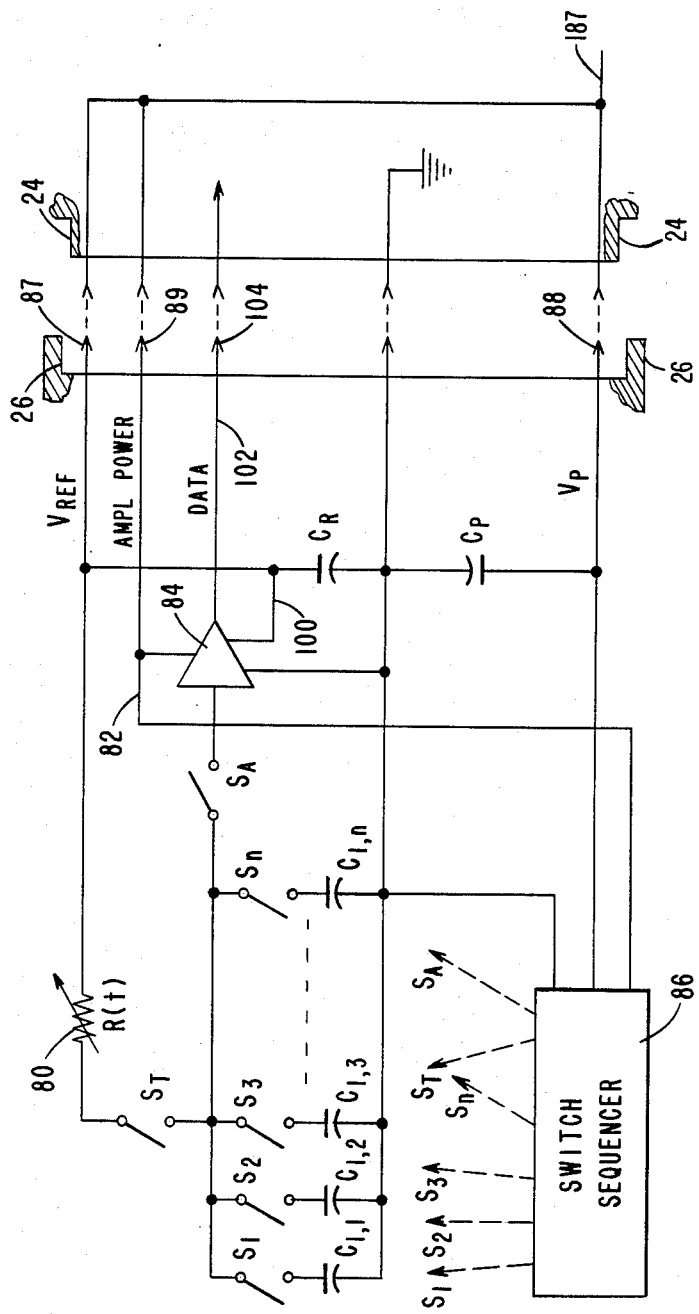
FIG. 3 is a schematic diagram of another embodiment of the electronic thermometer of FIG. 1.

FIG. 3 is a schematic diagram of another embodiment of the electronic thermometer unit 10 of FIG. 1 which is separate from the embodiment shown in FIG. 2. The device of FIG. 3 is located in the housing portion 14 and has a temperature probe 12 as shown in FIG. 1. Connection is made between the device of FIG. 3 and the master unit 16 of FIG. 1 by a connector 26, a fragmentary portion of which is shown in FIG. 3. Power is supplied to the embodiment of FIG. 3 from a single voltage source (not shown) over a single conductor 187, rather than the two voltage sources connected to the pins 55 and 57 of the embodiment of FIG. 2. For the embodiment of FIG. 3, data is transmitted sequentially over a data conductor 102, as will be explained. In the device of FIG. 3, a large reference or source capacitor $C_R$ is provided to transfer a small charge to a series of small measuring capacitors $C_{1,1}$ through $C_{1,n}$. The charge is transferred through a thermistor 80, having a resistance R(t), which is a function of time following the placement of the electronic thermometer unit under the tongue of a patient, and which is connected to each small capacitor for a time in the order of one-half of the time constant of $C_iR(t)$ wherein $C_i$ represents any of the capacitors $C_{1,1}$ through $C_{1,n}$ and R(t) represents all expected values of the resistance of the thermistor 80. In this fashion, each individual small capacitor can be charged by an amount that is a sensitive function of the temperature of the thermistor 80 at the time a switch $S_1$ through $S_n$ corresponding to one of the individual small capacitors $C_{1,1}$ through $C_{1,n}$ is closed, simultaneously with the closing of the thermistor switch $S_T$.

The circuit of FIG. 3 shows the mentioned source capacitor $C_R$, which is a 0.1 microfarad capacitor, and a second capacitor $C_P$, which is a 50 microfarad capacitor rated at about 10 volts. A typical value for the small capacitors $C_{1,1}$ through $C_{1,n}$ is 10 picofarads. A line 82 denoted AMPL POWER is connected to an output amplifier 84 and a switch sequencer integrated circuit 86. The switch sequencer 86, when activated, sequentially closes switches $S_1$ through $S_n$ one after the other in a timed sequence, as will be explained.

When the electronic thermometer of FIG. 3 is plugged into the master unit 16 as described in connection with FIG. 1, the source capacitor $C_R$ is charged from a voltage on conductor 187 connected to a voltage source (not shown) in the master unit 16 through pin 87 of the connector portions 24 and 26. Also, the capacitor $C_P$ is charged from the voltage on conductor 187 through pin 88 of the mated connector portions 24 and 26. It will also be mated that the AMPL POWER line 82 is energized by pin 89 from the voltage on conductor 187, which voltage on conductor 187 prevents the activation of the switch sequencer circuit 86. When the thermometer unit of FIG. 3 is removed from the master unit 16 as described in connection with FIG. 1, the connection between mated connector portions 24 and 26 (See FIG. 1) is broken and the switch sequencer 86 senses the voltage on AMPL POWER line 82 dropping to zero, which instructs the switch sequencer 86 to begin its data collection mode.

Figure 4:
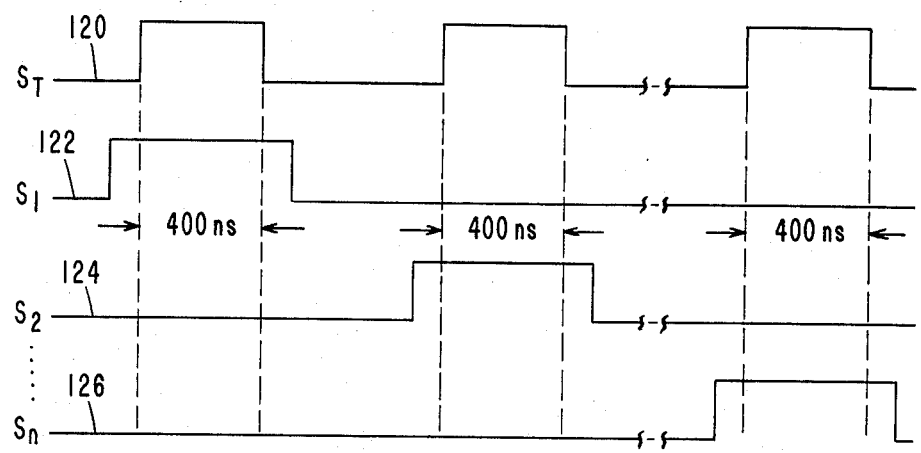
FIG. 4 is a timing diagram illustrating one method of operation of the electronic thermometer of FIG. 3 during its data collecting mode.
Figure 5:
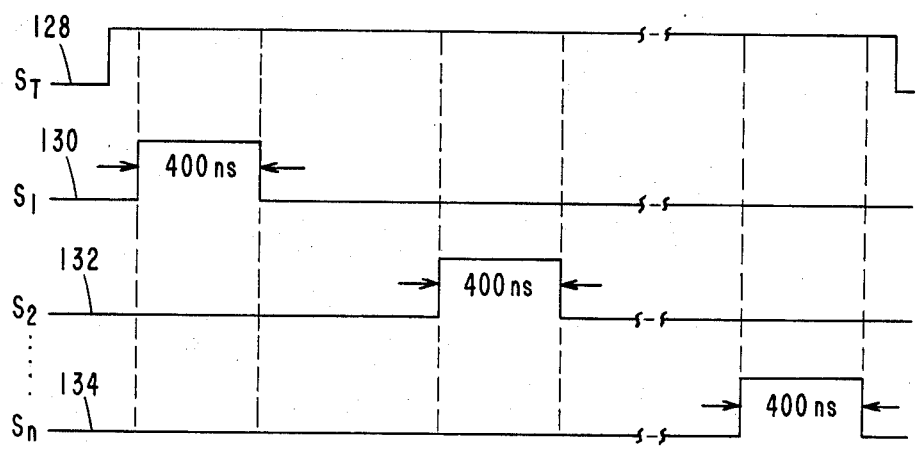
FIG. 5 is a timing diagram illustrating an alternate method of operation of the electronic thermometer of FIG. 3 during its data collecting mode.

FIGS. 4 and 5 show two possible alternatives for the operation of the switch sequence circuit 86. In FIG. 4, the switch $S_t$ is precisely controlled, while the switches $S_1$ through $S_n$ are sequentially closed, each during a period which overlaps with one of the closings of switch $S_T$. The waveform 120 illustrates the operation of the switch $S_T$, with the positive going edges of the pulses of waveform 120 showing the closing of switch $S_T$, and the negative going edges showing the opening of the switch $S_T$. The switch $S_T$ is closed for a known precise time, on the order of one-half of the time constant $C_iR(t)$. The thermistor resistance R(t) will be a function of the temperature, but will not vary by a large amount over the temperature range of importance. The resistance of the thermistor 80 is approximately 0.1 megohm, and the $C_iR(t)$ time constant is approximately one microsecond. Thus, an appropriate length of time for closure of the switch $S_T$ in the operation of FIG. 4, would be about 400 nanoseconds.

In this operation, the switch sequencer circuit 86, powered by the capacitor $C_P$, closes and opens the switch $S_T$ n times, once while each of the switches $S_1$ through $S_n$ is closed. In FIG. 4, the waveforms 122, 124 and 126 show the operation of the switches $S_1$, $S_2$ and $S_n$ respectively. In this method of operation, $S_T$ would define the exact duration of the connection between the source capacitor $C_R$ and each of the storage capacitors $C_{1,1}$ through $C_{1,n}$.

One of the advantages of the operation of FIG. 4 is that only the switch $S_T$ would require precise timing. The other switches $S_1$ through $S_n$ could then be a crude set of multiplexer or selector switches requiring only that they be of sufficiently high impedance when off to avoid undue leakage of the stored charge from storage capacitors $C_{1,1}$ through $C_{1,n}$.

Another method of operation of the switch sequence circuit 86 is shown in FIG. 5 wherein the switch $S_T$ is closed throughout the sequential closings of the switches $S_1$ through $S_n$. The waveform 128 illustrates the closing of the switch $S_T$, and the waveform 130, 132 and 134 illustrate the closing of the switches $S_1$, $S_2$ and $S_n$ respectively. In this method of operation, the switches $S_1$ through $S_n$ control the timing, with each switch going closed at a precisely known time and staying closed for the mentioned approximately 400 nanoseconds. Thus, in the operation FIG. 5, $S_T$ acts as a routing switch, switching the storage capacitors $C_{1,1}$ through $C_{1,n}$ to the source capacitor $C_R$ during the data collection phase. In either of the operations of FIG. 4 or FIG. 5, the switch $S_T$ remains open in the data transmitting mode, to be described.

As the thermometer unit heats up, each small capacitor receives a different charge. Thus, the charge stored on each of the small capacitors $C_{1,1}$ through $C_{1,n}$ provides an accurate measure of the temperature when each was charged. The self-discharge time constant for each small capacitor $C_{1,1}$ through $C_{1,n}$ is many hours, and the leakage of the switches $S_1$ through $S_n$ is less than $10^{-15}$ amps. Thus, the small capacitors $C_{1,1}$ through $C_{1,n}$ will have a voltage change of approximately one volt in three hours. This time is more than sufficient to hold the charge while the thermometer unit is being transferred to the master unit 16 of FIG. 1.

After a time, at the most a few minutes, the nurse retrieves the thermometer unit 10 and reconnects it to the master unit 16 as described in connection with FIG. 1. The AMPL POWER line 82 is reenergized, providing a signal to the switch sequencer circuit 86 to go into its data transfer mode. If desired, a timer circuit can be included to supply information to the amplifier 84 which would indicate the total elapsed time since the completion of the measuring sequence.

In its data transmitting mode, the switch sequencer circuit 86 closes switch $S_A$, and sequentially closes each of the switches $S_1$ through $S_n$ in a timed sequence, to deliver the stored data over data conductor 102 via connector 104 to the amplifier for conditioning and transfer to the master unit 16. As mentioned previously, the switch $S_T$ remains open during the data transmitting mode.

The amplifier 84 may be linear, merely transferring a measure of the actual voltage stored on each of the capacitors $C_{1,1}$ through $C_{1,n}$, or it may transfer a measurement of the ratio between the voltage on each of the small capacitors $C_{1,1}$ through $C_{1,n}$ and the voltage $V_{REF}$ from pin 87 over line 100 to the amplifier 84. This would have the advantage of relaxing the required constancy of the voltage $V_{REF}$, since the charge transferred to each small capacitor $C_{1,1}$ through $C_{1,n}$ can be made proportional to the voltage $V_{REF}$, regardless of the absolute value of $V_{REF}$.

The data on data line 102 from the amplifier 84 may be supplied through pin 104 to an analog-to-digital converter in the master unit 16 for processing as previously described.

The small capacitors $C_{1,1}$ through $C_{1,n}$ can be of any low-leakage type sufficiently small to be included in the probe. The type considered optimal for the design would be MOS elements directly on the surface of an integrated circuit containing the MOS transistor switches $S_T$, $S_A$, and $S_1$ through $S_n$. In addition, the switch sequencer circuit 86 and the amplifier 84 may be on the same integrated circuit chip. As previously mentioned, the capacitor $C_R$ has a value of 0.1 microfarads and the value for the small capacitors $C_{1,1}$ through $C_{1,n}$ is typically 10 picofarads. The capacitor $C_R$ supplies the source charge to be transferred to the individual small capacitors $C_{1,1}$ through $C_{1,n}$. If there are ten nearly identical small capacitors, then even if each small capacitor was fully charged during the data collection operation, the charge on the source capacitor $C_R$ would decrease by only about 0.1 percent in the typical case. The capacitor $C_P$ is the power source for the switch sequencer circuit 86 and can be a fairly crude electrolytic or other high energy storage type, rated for about ten volts and having a capacity of 50 microfarads, as previously mentioned.

If the leakage of the switches $S_1$ through $S_n$ is not made small enough, but is predictable, the accuracy of the data can be preserved in two ways. First, the data sent by the switch sequencer circuit 86 may include the elapsed time following the measurement and before reconnection to the master unit 16. This elapsed time can be interpreted by programming in the master unit 16 to correct the data. Second, a controlled leak can be placed across the source capacitor $C_R$ so that its voltage will drop at a rate to compensate for the loss of the charge of the capacitors $C_{1,1}$ through $C_{1,n}$ through the switches $S_1$ through $S_n$, as explained. If the amplifier measures the ratio of voltage on the small capacitors $C_{1,1}$ through $C_{1,n}$ to that on the capacitor $C_R$, a more accurate temperature measurement will result.

Small capacitors $C_{1,1}$ through $C_{1,n}$ which are external to the switch sequencer circuit 86 may also be provided, thus allowing the small capacitors $C_{1,1}$ through $C_{1,n}$ to be of a larger value than the mentioned 10 picofarad value. In this case, a much larger capacitor $C_R$ is required. Also, the use of external small capacitors $C_{1,1}$ through $C_{1,n}$ requires more terminal pads on the integrated circuit of the switch sequencer circuit 86.

Thus, several embodiments of an apparatus have been described which provide the aforementioned objects. It will be understood by those skilled in the art that the disclosed embodiments are exemplary only, and that the various elements disclosed may be replaced by equivalents without departing from the invention hereof, which equivalents are intended to be covered by the appended claims.

What is claimed is:

1. An electronic thermometer comprising:
   temperature sensing means for sensing a temperature and providing over time, a series of temperature related electric parameters, said temperature sensing means comprising a bridge circuit including a thermistor, and an analog-to-digital converter for converting the voltage across said bridge circuit to a digital representation;
   data storing means connected to said temperature sensing means for storing said series of temperature related electric parameters, said data storing means including a microprocessor connected to said analog-to-digital converter of said temperature sensing means, and a random access memory device connected to said microprocessor, wherein said microprocessor receives periodic digital representations of the voltage across said bridge circuit and stores them in said random access memory device;
   data transmitting means having an output and connected to said data storing means for transmitting said series of temperature related electric parameters upon command, said data transmitting means including a universal asynchronous receiver transmitter (UART) connected to said microprocessor, wherein said UART receives the digital representations of the voltages across said bridge circuit in parallel fashion, and transmits them in serial fashion on the output of said data transmitting means;
   connector means connected to the output of said data transmitting means, said connector means having a command input which, when connected to a power source, receives an electrical command for commanding said data transmitting means to transmit data, and further having a data output for providing thereon the data transmitted from said data transmitting means; and
   electrical energy storage means electrically connected to said connector means which, when said connector means is connected to the power source, receives and stores electrical energy, and which, when said connector means is not connected to the power source, supplies the stored electrical energy to said temperature sensing element and said data storing means.

2. The electronic thermometer of claim 1 further comprising a visual indicating means connected to said microprocessor for providing a visual indication of the receipt and storage by said microprocessor of a set number of periodic digital representations of the voltages across said bridge circuit.

3. The electronic thermometer of claim 2 wherein said visual indicating means includes a light emitting diode.

4. An electronic thermometer comprising:
   temperature sensing means for sensing a temperature and providing over time, a series of temperature related electric parameters, said temperature sensing means comprising a thermistor whose resistance varies as its temperature varies;
   data storing means connected to said temperature sensing means for storing said series of temperature related electric parameters, said data storing means comprising a plurality of storage capacitors, each for receiving an electrical charge transferred through said thermistor as an indication of the temperature of the thermistor at the time the electrical charge was transferred therethrough, a plurality of corresponding switches, and switch control means for controlling the closing of said plurality of switches such that an electrical charge is transferred through said thermistor to each of said storage capacitors in a set order;
   data transmitting means having an output and connected to said data storing means for transmitting said series of temperature related electric parameters upon command;
   connector means connected to the output of said data transmitting means, said connector means having a command input which, when connected to a power source, receives an electrical command for commanding said data transmitting means to transmit data, and further having a data output for providing thereon the data transmitted from said data transmitting means; and electrical energy storage means electrically connected to said connector means which, when said connector means is connected to the power source, receives and stores electrical energy, and which, when said connector means is not connected to the power source, supplies the stored electrical energy to said temperature sensing element and said data storing means.

5. The electronic thermometer of claim 4 wherein said electrical energy storage means includes a source capacitor for storing the electrical charge to be transferred to each of said storage capacitors; and further comprises a capacitor switch connected between said source capacitor and said plurality of switches, said capacitor switch for closing for a set length of time which, when closed, provides for the transfer of the electrical charge through said thermistor to said storage capacitors.

6. The electronic thermometer of claim 4 wherein said data transmitting means includes amplifier means connected between the output of said data transmitting means and said plurality of switches for transmitting the charge stored by each of said storage capacitors through the output of said data transmitting means and said connector means.

7. The electronic thermometer of claim 5 wherein said data transmitting means includes amplifier switch means connected between said amplifier means and said plurality of switches and controlled such that, upon the receipt of said electrical command to said connector means, said amplifier switch closes, and said switch control means controls the closing of said plurality of switches such that the electrical charge stored on the corresponding ones of said storage capacitors is transferred to said amplifier means in a set order.

* * * * *